(12) United States Patent
Du et al.

(10) Patent No.: US 12,468,172 B2
(45) Date of Patent: Nov. 11, 2025

(54) THREE-DIMENSIONAL IMAGING SYSTEM AND METHOD

(71) Applicant: Rayz Technologies Co. Ltd., Beijing (CN)

(72) Inventors: Detao Du, Beijing (CN); Ruxin Chen, Beijing (CN)

(73) Assignee: Rayz Technologies Co. Ltd., Beijing (CN)

( * ) Notice: Subject to any disclaimer, the term of this patent is extended or adjusted under 35 U.S.C. 154(b) by 339 days.

(21) Appl. No.: 18/092,807

(22) Filed: Jan. 3, 2023

(65) Prior Publication Data

US 2023/0143702 A1 May 11, 2023

Related U.S. Application Data

(63) Continuation of application No. PCT/CN2021/095666, filed on May 25, 2021.

(30) Foreign Application Priority Data

Jul. 3, 2020 (CN) .......................... 202010630512.1

(51) Int. Cl.
*G02B 30/25* (2020.01)
*G02B 27/28* (2006.01)
(Continued)

(52) U.S. Cl.
CPC ........... *G02B 30/25* (2020.01); *G02B 27/286* (2013.01); *H04N 13/254* (2018.05); *H04N 13/296* (2018.05)

(58) Field of Classification Search
CPC .... G02B 27/48; G02B 26/10; G02B 19/0014; G02B 19/009; G02B 19/0085;
(Continued)

(56) References Cited

U.S. PATENT DOCUMENTS 5,526,184 A * 6/1996 Tokuhashi ......... G02B 27/0172
359/489.07
7,236,235 B2 * 6/2007 Dimsdale .............. G01S 17/894
356/5.1
(Continued)

FOREIGN PATENT DOCUMENTS

CN 102292980 A 12/2011
CN 102466471 A 5/2012
(Continued)

OTHER PUBLICATIONS

International Search Report and Written Opinion issued in PCT/CN2021/095666 on Jul. 29, 2021.
(Continued)

*Primary Examiner* — Michael P Stafira
(74) *Attorney, Agent, or Firm* — Venable LLP; Henry J. Daley

(57) ABSTRACT

Disclosed is a three-dimensional imaging system. The system comprises: an optical emitter that emits light pulses to a target scene; an optical modulator that modulates the optical state of at least part of the light pulses emitted from the optical emitter and/or of at least part of light pulses returned from the target scene; an optical element array that receives a modulated light pulses; a photoelectric detector that comprises an imaging lens, and receives an optical signal passing through the optical element array and converts the received optical signal into an electrical signal; and a controller, wherein the controller applies a control to the
(Continued)

optical modulator by means of a circuit, the optical modulator modulates the optical state of the light pulses into a function of time on the basis of the control.

16 Claims, 6 Drawing Sheets

(51) Int. Cl.
*H04N 13/254* (2018.01)
*H04N 13/296* (2018.01)

(58) Field of Classification Search
CPC ............ G02B 27/095; G02B 19/0052; G02B 19/0095; G02B 6/02; G02B 6/06; G02B 6/0239; G02B 19/0028; G02B 19/0057; G02B 19/0066; G02B 26/105; G02B 27/0961; G02B 27/0966; G02B 27/46; G02B 6/2726; G02B 5/20; G02B 6/1225; G02B 6/3672; G02B 26/106; G02B 27/28; G02B 6/12; G02B 6/12007; G02B 26/0833; G02B 27/0172; G02B 5/32; G02B 6/0008; G02B 6/08; G02B 6/10; G02B 6/26; G02B 6/276; G02B 1/005; G02B 2027/0178; G02B 6/024; G02B 6/036; G02B 6/105; G02B 6/12016; G02B 6/13; G02B 6/2766; G02B 2027/0127; G02B 2027/0134; G02B 21/0032; G02B 21/0076; G02B 26/005; G02B 26/0808; G02B 26/0875; G02B 27/0025; G02B 27/0093; G02B 27/0101; G02B 27/0103; G02B 27/017; G02B 27/1006; G02B 27/286; G02B 30/24; G02B 5/008; G02B 5/1814; G02B 5/1828; G02B 5/3075; G02B 6/001; G02B 6/132; G02B 6/3608; G02B 6/4204; G02B 6/4409; G02B 2006/12142; G02B 2027/0109; G02B 2027/0123; G02B 2027/0138; G02B 2027/0174; G02B 2027/0187; G02B 21/0004; G02B 21/0048; G02B 21/06; G02B 21/24; G02B 26/04; G02B 26/06; G02B 26/0841; G02B 27/0031; G02B 27/0075; G02B 27/0087; G02B 27/106; G02B 27/1093; G02B 27/283; G02B 3/0087; G02B 30/56; G02B 5/128; G02B 6/00; G02B 6/02042; G02B 6/04; G02B 6/12011; G02B 6/12019; G02B 6/1226; G02B 6/1228; G02B 6/29344; G02B 6/29395; G02B 6/43; G02B 17/08; G02B 2006/0098; G02B 2006/12061; G02B 2006/12097; G02B 2006/12102; G02B 2006/12104; G02B 2006/12114; G02B 2006/12119; G02B 2006/12145; G02B 2006/12147; G02B 2006/1215; G02B 2006/12159; G02B 2027/0118; G02B 2027/0125; G02B 2027/013; G02B 2027/0132; G02B 2027/014; G02B 2027/0163; G02B 2027/0185; G02B 21/0028; G02B 21/0052; G02B 21/006; G02B 21/008; G02B 21/0092; G02B 21/082; G02B 21/16; G02B 21/32; G02B 21/361; G02B 21/367; G02B 23/00; G02B 26/08; G02B 26/0816; G02B 26/0883; G02B 26/101; G02B 26/103; G02B 27/0012; G02B 27/01; G02B 27/0176; G02B 27/0179; G02B 27/09; G02B 27/0944; G02B 27/1033; G02B 27/4205; G02B 27/425; G02B 27/58; G02B 3/00; G02B 3/0006; G02B 3/0037; G02B 3/06; G02B 30/10; G02B 30/27; G02B 30/29; G02B 30/34; G02B 30/36; G02B 5/005; G02B 5/1866; G02B 5/30; G02B 6/0006; G02B 6/02085; G02B 6/02342; G02B 6/12002; G02B 6/12004; G02B 6/12023; G02B 6/122; G02B 6/125; G02B 6/131; G02B 6/262; G02B 6/2706; G02B 6/2746; G02B 6/29302; G02B 6/30; G02B 6/305; G02B 6/32; G02B 6/325; G02B 6/34; G02B 6/3502; G02B 6/3526; G02B 6/3582; G02B 6/3586; G02B 6/3636; G02B 6/3644; G02B 6/3692; G02B 6/3833; G02B 6/3834; G02B 6/3839; G02B 6/3873; G02B 6/3874; G02B 6/3885; G02B 6/3897; G02B 6/40; G02B 6/42; G02B 6/4206; G02B 6/421; G02B 6/4214; G02B 6/423; G02B 6/4231; G02B 6/4249; G02B 6/425; H04N 5/74; H04N 9/12; H04N 13/344; H04N 9/3179; H04N 13/305; H04N 13/32; H04N 13/322; H04N 9/64; H04N 13/341; H04N 9/3129; H04N 1/12; H04N 1/191; H04N 1/1916; H04N 13/00; H04N 13/117; H04N 13/239; H04N 13/286; H04N 13/31; H04N 13/327; H04N 13/332; H04N 13/361; H04N 13/363; H04N 13/366; H04N 13/383; H04N 2013/0085; H04N 2013/403; H04N 23/00; H04N 3/14; H04N 5/21; H04N 9/31; H04N 9/3102; H04N 9/3105; H04N 9/3132; H04N 9/3138; H04N 9/3152; H04N 9/3161; H04N 9/317; H04N 9/3197; H04N 9/67; H04N 9/76

See application file for complete search history.

(56) References Cited

U.S. PATENT DOCUMENTS

| | | | | |
|---|---|---|---|---|
| 8,451,320 | B1* | 5/2013 | Cole | H04N 19/597 348/43 |
| 8,823,848 | B2* | 9/2014 | Chipman | G01J 4/04 359/437 |
| 10,104,365 | B2* | 10/2018 | Banks | G01S 7/4865 |
| 10,419,741 | B2* | 9/2019 | Calpe Maravilla | G01S 7/4814 |
| 11,209,664 | B2* | 12/2021 | Banks | H04N 13/296 |
| 2006/0007422 | A1* | 1/2006 | Dimsdale | G01S 7/4868 356/4.02 |
| 2012/0075513 | A1 | 3/2012 | Chipman et al. | |
| 2012/0212592 | A1* | 8/2012 | Breidenthal | H04N 13/239 348/54 |
| 2016/0327779 | A1* | 11/2016 | Hillman | G02B 21/0032 |
| 2017/0248796 | A1 | 8/2017 | Banks et al. | |

FOREIGN PATENT DOCUMENTS

| | | | | |
|---|---|---|---|---|
| CN | 105785389 | A | 7/2016 | |
| CN | 106569224 | A | 4/2017 | |
| CN | 108780142 | A | 11/2018 | |
| CN | 109283673 | A * | 1/2019 | ......... G02B 21/0092 |
| CN | 110325879 | A | 10/2019 | |
| CN | 110471083 | A | 11/2019 | |
| JP | 2021113987 | A * | 8/2021 | ........... G02B 21/002 |

(56) References Cited

FOREIGN PATENT DOCUMENTS

| WO | WO-2012174633 A1 | * | 12/2012 | ........... H04N 13/211 |
| WO | WO-2015117115 A1 | * | 8/2015 | ......... G01N 21/6458 |
| WO | WO-2020056059 A1 | * | 3/2020 | ......... G01D 5/35312 |

OTHER PUBLICATIONS

Chenfei et al., "Experimental Research on a Scannerless 3D Imaging Laser Radar", Chinese Journal of Laser, Jun. 2009, vol. 36, No. 6, (5 pages).

* cited by examiner

THREE-DIMENSIONAL IMAGING SYSTEM AND METHOD

CROSS-REFERENCE TO RELATED APPLICATIONS

This disclosure is a continuation of International Application No. PCT/CN2021/095666, filed on May 25, 2021, which claims priority and interest in Chinese patent application No. 202010630512.1 filed with the China National Intellectual Property Administration (CNIPA) on Jul. 3, 2020, which are incorporated herein by reference in their entirety.

TECHNICAL FIELD

The present disclosure relates to the field of optical imaging, in particular to a three-dimensional imaging system for capturing three-dimensional information and methods thereof.

BACKGROUND

In some conventional three-dimensional imaging systems, 3D coordinates of a target object are obtained by irradiating the object with a laser pulse and using a Kerr box or Pockels box to change a polarization state of the laser pulse reflected from the object into a function of time. As a result, a polarization state of components of the laser pulse reflected by features (having shorter flight times) of the target object closer to the imaging systems is less affected, while a polarization state of components of the laser pulse reflected by features (having longer flight times) of the target object further away from the imaging systems is affected to a greater extent. By imaging two polarization components of a polarization-modulated laser beam on two separate focal plane arrays, position information of the target object may be calculated.

However, the above method requires calibration and alignment of images acquired on both focal planes, which may easily introduce errors. In addition, the above method adds many additional optical devices in order to separate the polarization state, which leads to more complex optical designs and increases costs as well as sizes and weights of the systems.

In some existing solutions, the time of flight may be determined based on the polarization state of an optical signal, and the method adopted is usually: setting a linear polarizer in front of and behind an electro-optical modulator, and detecting an intensity of the optical signal passing through the two linear polarizers as the electro-optical modulator modulates a polarization direction of the optical signal, wherein a polarization direction of the linear polarizer set in front of the electro-optical modulator and a polarization direction of the linear polarizer set behind the electro-optical modulator are not parallel. However, due to the linear polarizers set in front of and behind the electro-optical modulator, energy of the optical signal from a target scene is significantly reduced and a flux is low, resulting in low measurement accuracy or more demanding requirements on an imaging chip.

SUMMARY

The present disclosure proposes a three-dimensional imaging system and methods for measuring using the three-dimensional imaging system, which may solve or partially solve the problems existing in the prior art.

According to a first aspect of the present disclosure, the three-dimensional imaging system may include: an optical emitter, configured to emit light pulses to a target scene, the target scene returning at least part of the light pulses. The three-dimensional imaging system may further include: an optical modulator, configured to modulate an optical state of at least part of the light pulses emitted from the optical emitter and/or of at least part of a light pulses returned from the target scene; an optical element array, configured to receive at least part of the modulated light pulses, where at least within a first preset time range before the emission of the light pulses and/or within a second preset time range after the emission of the light pulses, the optical element array has a function of transmitting light of at least three optical states different from each other, and the optical states may include but not limited to a polarization state, transmission, or reflectivity; a photoelectric detector, including an imaging lens, configured to receive an optical signal passing through the optical element array, and convert the received optical signal to an electrical signal; and a controller, where the controller applies a control to the optical modulator by means of a circuit, the optical modulator modulates the optical state of the light pulses emitted from the optical emitter and/or of at least part of the light pulses returned from the target scene into a function of time based on the control, and the controller calculates a distance between each pixel point in the target scene and the optical emitter and/or a relative light intensity of each pixel point in the target scene based on the electrical signal from the photoelectric detector and the control applied to the optical modulator.

In an embodiment, the optical state is the polarization state of light.

In an embodiment, the optical element array comprises at least three polarizers having fixed polarization directions different from each other.

In an embodiment, the optical element array comprises at least one polarization component having an adjustable polarization direction.

In an embodiment, the optical element array consists of four polarization components, and the four polarization components are arranged in a window shape.

In an embodiment, the optical element array comprises at least one optical element array unit, each of the at least one optical element array unit comprises at least three polarization components having polarization directions different from each other; and
the photoelectric detector comprises at least one photoelectric detector unit corresponding to the at least one optical element array unit.

In an embodiment, the optical element array unit comprises four polarizers, and the four polarizers are arranged in a window shape.

In an embodiment, the four polarization components are respectively a 0° directional linear polarizer, a 45° directional linear polarizer, a 90° directional linear polarizer and a 135° directional linear polarizer.

In an embodiment, three polarization components of the at least three polarization components having polarization directions different from each other are respectively a 0° directional linear polarizer, a 45° directional linear polarizer, and a left-handed polarizer or right-handed polarizer.

In an embodiment, the optical element array comprises a thin film polarizer, a wire grid polarizer, a prismatic polarizer, a liquid crystal polarizer, or a combination thereof.

In an embodiment, the optical modulator comprises a crystal, a liquid crystal having electro-optical modulation effect, and/or a crystal, a liquid crystal having acousto-optical modulation effect.

In an embodiment, the optical modulator comprises a plurality of optical modulators connected in series.

In an embodiment, the optical element array and the photoelectric detector are integrally integrated.

In an embodiment, the controller is in unidirectional communication with the optical emitter or the optical modulator, and the controller is in bi-directional communication with the photoelectric detector.

In an embodiment, the optical emitter and the photoelectric detector are integrally integrated, or formed separately and then integrated.

In an embodiment, the light pulses have a wavelength of 300 nm-750 nm, 700 nm-1000 nm, 900 nm-1600 nm, 1 um-5 um or 3 um-15 um.

In an embodiment, the light pulses have a pulse width of 0.1 ps-5 ns, 1 ns-100 ns, 100 ns-10 us, or 10 us-10 ms.

In an embodiment, the photoelectric detector comprises a silicon-based detector CCD, CMOS, and/or Ge, InGaAs, InSb, InAs, HgCaTe, QWIP detector or detector array.

In an embodiment, the three-dimensional imaging system further comprising a lens provided close to one side of the target scene, and/or a lens provided between the optical modulator and the optical element array.

In an embodiment, the three-dimensional imaging system further comprising a linear polarizer and/or circular polarizer provided on a side of the optical modulator close to the target scene.

In another aspect, the present disclosure also provides a method for forming a three-dimensional imaging system, including: providing the optical modulator on an optical path of the optical emitter, such that pulsed light emitted by the optical emitter has a time-varying optical state when returning via the target scene; receiving an optical signal modulated via the optical modulator by means of the optical element array, where the optical element array includes at least three polarization components having polarization directions different from each other; deploying the photoelectric detector behind the optical element array to receive the optical signal passing through the optical element array and to convert the received optical signal to the electrical signal; and providing the controller to be electrically connected to the optical emitter, the optical modulator, and the photoelectric detector, where the controller applies a control to the optical modulator, the optical modulator modulates a return part of the light pulses into a function of time based on the control, and the controller calculates the distance between each pixel point in the target scene and the optical emitter and/or the relative light intensity of each pixel point in the target scene based on the electrical signal from the photoelectric detector and the control applied to the optical modulator.

In an embodiment, the controller applies the control to the optical modulator by means of the circuit, and the optical modulator modulates an optical state of the return part of the light pulses into a monotonic function of time based on the control.

In an embodiment, the method for forming a three-dimensional imaging system further includes providing a lens between the target scene and the optical element array.

In another aspect, the present disclosure also provides a method for ranging using the three-dimensional imaging system described above, comprising: taking a first shot of the target scene at an initial time point to obtain baseline image information; and taking a second shot at a next time point at a predetermined time interval from the initial time point to obtain comparative image information, wherein, the distance between each pixel point in the target scene and the optical emitter and/or the relative light intensity of each pixel point in the target scene is determined based on the baseline image information and the comparative image information.

In another aspect, the present disclosure also provides a method for ranging using the three-dimensional imaging system described above, comprising: calibrating the three-dimensional imaging system; and taking a shot at a predetermined time point to obtain image information, and determining the distance between each pixel point in the target scene and the optical emitter and/or the relative light intensity of each pixel point in the target scene based on the image information and system calibration information.

In another aspect, the present disclosure also provides a method for ranging using the three-dimensional imaging system described above, comprising: modulating, by means of the optical modulator, an optical signal returned by pulsed light emitted by the optical emitter via the target scene; receiving the optical signal modulated via the optical modulator by means of the optical element array, wherein the optical element array comprises at least three polarization components having polarization directions different from each other; receiving, using the photoelectric detector, the optical signal passing through the optical element array and converting the received optical signal into the electrical signal; applying a control by means of the controller to the optical modulator, the optical modulator modulating a return part of the light pulses into a function of time based on the control; and calculating the distance between each pixel point in the target scene and the optical emitter and/or the relative light intensity of each pixel point in the target scene by means of the controller based on the electrical signal from the photoelectric detector and the control applied to the optical modulator.

In another aspect, the present disclosure also provides a method for ranging using the three-dimensional imaging system described above, comprising: modulating, by means of the optical modulator, an optical signal returned by pulsed light emitted by the optical emitter via the target scene; receiving the optical signal modulated via the optical modulator by means of the optical element array, wherein the optical element array comprises, at least within a predetermined period of time, at least one optical component that transmits light having at least three optical states different from each other; receiving, using the photoelectric detector, the optical signal passing through the optical element array and converting the received optical signal into the electrical signal; applying a control by means of the controller to the optical modulator, the optical modulator modulating a return part of the light pulses into a function of time based on the control; and calculating the distance between each pixel point in the target scene and the optical emitter and/or the relative light intensity of each pixel point in the target scene by means of the controller based on the electrical signal from the photoelectric detector and the control applied to the optical modulator.

BRIEF DESCRIPTION OF THE DRAWINGS

Exemplary embodiments will be more clearly understood in light of the following brief description in conjunction with the accompanying drawings. The accompanying drawings represent the non-limiting exemplary embodiments described herein. In the accompanying drawings.

DETAILED DESCRIPTION OF EMBODIMENTS

Figure 1:
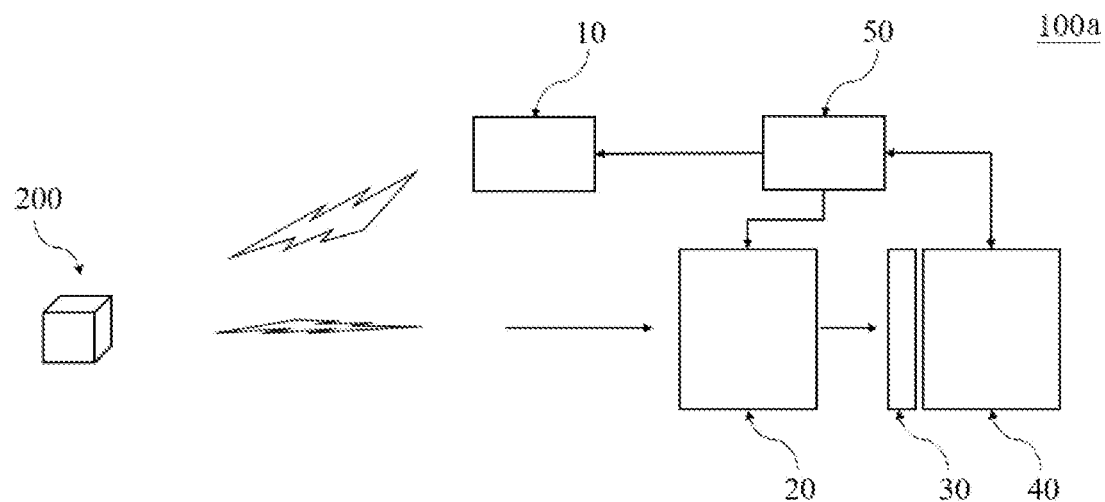
FIG. 1 shows a schematic diagram of a three-dimensional imaging system according to an exemplary embodiment of the present disclosure.

For better understanding of the present disclosure, more detailed descriptions of various aspects of the present disclosure will be made with reference to the accompanying drawings. It should be understood that these detailed descriptions are merely a description of exemplary embodiments of the present disclosure and are not intended to limit the scope of the present disclosure in any way. Throughout the specification, the same symbols in the accompanying drawings refer to the same elements. The expression "and/or" includes any one of the relevant listed items and any combination of any two or more of the relevant listed items.

Features described in the present disclosure may be implemented in different forms and should not be construed as being limited to examples described in the present disclosure. More precisely, the examples described in the present disclosure are provided only to illustrate some of the many possible ways of implementing methods, apparatuses and/or systems described in the present disclosure, which will become apparent upon understanding the disclosure of the present disclosure.

The use of the word "may" in relation to an example or embodiment (e.g., with respect to what an example or embodiment may include or achieve) means that there is at least one example or embodiment that includes or achieves such a feature, but the full range of examples or embodiments is not limited thereto.

It should be noted that, in the specification, the expressions such as "first," "second" and "third" are only used to distinguish one feature from another, rather than represent any limitations to the features. Thus, the first optical modulator discussed below may also be referred to as the second optical modulator or the third optical modulator without departing from the teachings of the present disclosure.

In the accompanying drawings, the thicknesses, sizes and shapes of the components are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Throughout the specification, when, for example, an element is described as being "on", "connected to", or "coupled to" another element, the element may be located directly on, "connected to", or "coupled to" that other element, or there may be one or more other elements between the element and the other element. Conversely, when an element is described as being "directly on", "directly connected to", or "directly coupled to" another element, there may be no other element between that element and that other element.

For ease of description, spatially relative phrasing such as "above", "more above", "below" and "more below" may be used throughout this article to describe the relationship of one element to another as shown in the accompanying drawings. This spatially relative phrasing is intended to include different orientations of a device in use or operation, in addition to the orientations depicted in the accompanying drawings. For example, if a device in the accompanying drawings is turned over, an element described as being "above" or "more above" another element will be "below" or "more below" that other element. Thus, depending on the spatial orientation of the device, the phrasing "above" includes "above" and "below". The device may also be oriented in other ways (e.g., rotated 90 degrees or in other orientations) and the spatially relative phrasing used herein should be interpreted accordingly.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list.

As used herein, the words "approximately," "about," and similar words are used as words of approximation, not as words of degree, and are intended to describe the inherent bias in measured or calculated values that those of ordinary skill in the art would recognize.

Unless otherwise defined, all terms (including technical terms and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. Further, unless expressly limited or contradicted by the context, the specific steps contained in the methods described in the present disclosure need not be limited to the sequence described, but may be performed in any order or in parallel.

Figure 2:
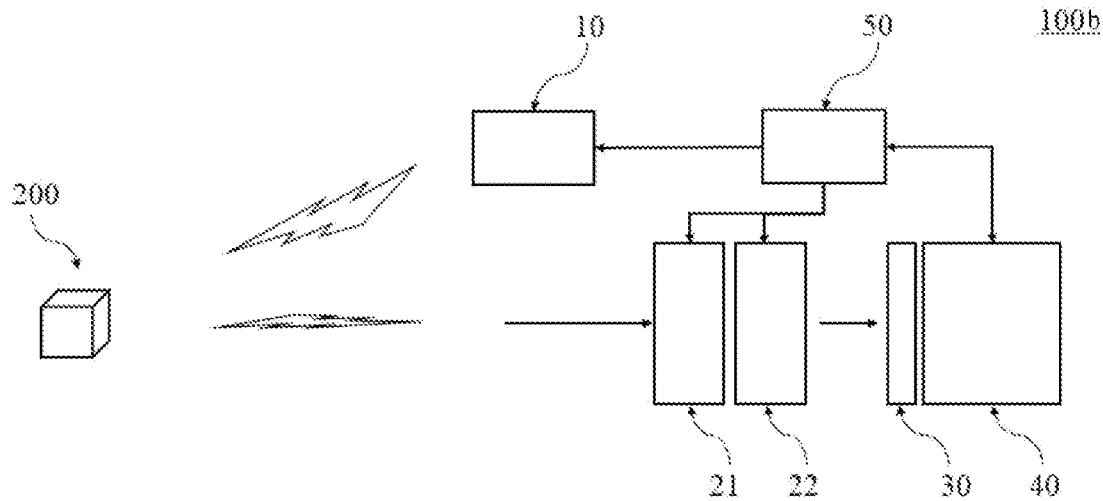
FIG. 2 shows a schematic diagram of a three-dimensional imaging system according to another exemplary embodiment of the present disclosure.
Figure 3A:
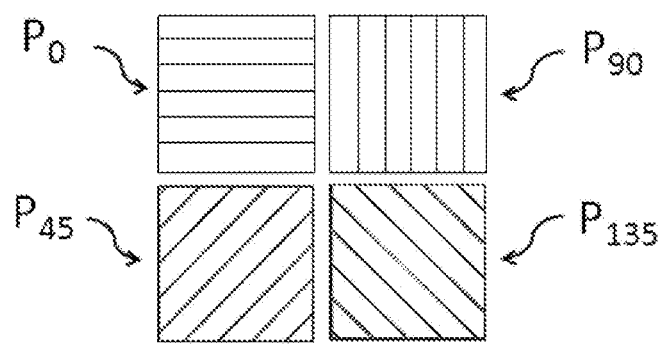
FIG. 3A shows a schematic diagram of a polarizer array unit according to an exemplary embodiment of the present disclosure.
Figure 3B:
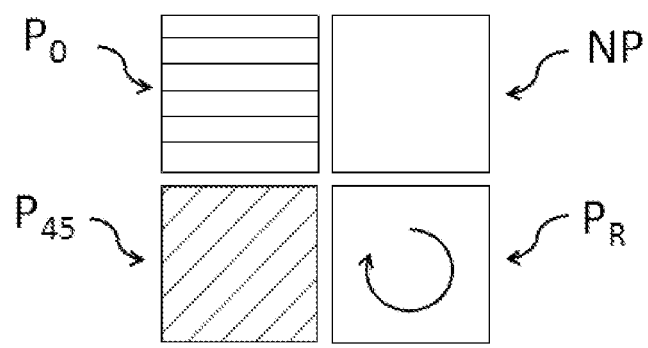
FIG. 3B shows a schematic diagram of a polarizer array unit according to another exemplary embodiment of the present disclosure.
Figure 3C:
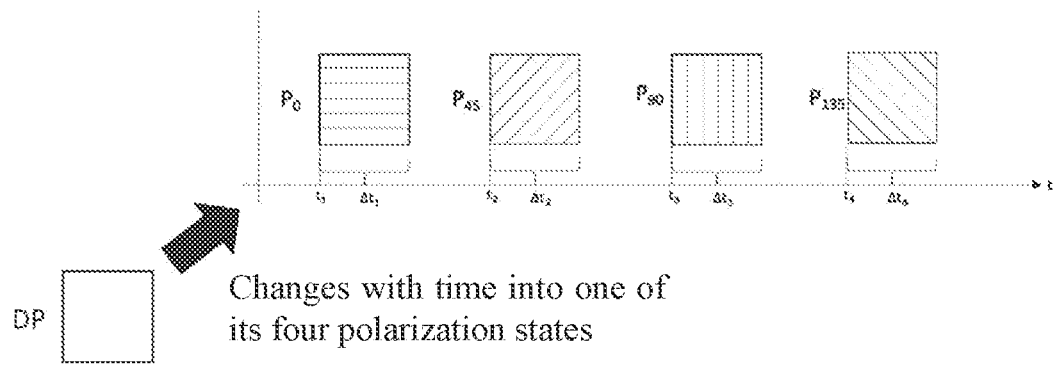
FIG. 3C shows a schematic diagram of a dynamic polarizer according to yet another exemplary embodiment of the present disclosure.

FIG. 1 shows a schematic diagram of a three-dimensional imaging system 100a according to an exemplary embodiment of the present disclosure, FIG. 2 shows a schematic diagram of a three-dimensional imaging system 100b according to another exemplary embodiment of the present disclosure, FIG. 3A shows a schematic diagram of a polarizer array unit according to an exemplary embodiment of the present disclosure, FIG. 3B shows a schematic diagram of a polarizer array unit according to another exemplary embodiment of the present disclosure, and FIG. 3C shows a schematic diagram of a dynamic polarizer according to yet another exemplary embodiment of the present disclosure.

Referring to FIG. 1, the three-dimensional imaging system 100a may include an optical emitter 10, an optical modulator 20, an optical element array 30, a photoelectric detector 40, and a controller 50.

The optical emitter 100 is configured to emit light pulses to a target scene to illuminate the target scene. For example, the light pulses may be emitted to the target scene according to a preset pattern. The optical emitter 10 may emit light pulses having a wavelength within a range of, for example, 300 nm-750 nm, 700 nm-1000 nm, 900 nm-1600 nm, 1 um-5 um, or 3 um-15 um. A pulse width may be, for example, 0.1 ps-5 ns, 1 ns-100 ns, 100 ns-10 us, or 10 us-10 ms. Parameters of the wavelength and the pulse width of the light pulses emitted by the optical emitter 10 are exemplified here by way of example only, however, the present disclosure is not limited thereto, other parameters of the wavelength and the pulse width that do not deviate from the teachings of the present disclosure are also allowed.

In some embodiments, the optical emitter 10 may be a semiconductor laser, a fiber laser, a solid-state laser. The optical emitter 10 may also be a mode-locked laser, an actively Q-modulated laser, a passively Q-modulated laser, or other directly modulated laser.

In some embodiments, the light pulses emitted by the optical emitter 10 may be modulated linear polarized light, circular polarized light, elliptical polarized light, or unpolarized light. A pulse re-frequency of the light pulses may be selected from a range of 1 Hz-100 Hz, 100 Hz-10 kHz, 10 kHz-1 MHz, or 1 MHz-100 MHz. A coherence length of the light pulses may be less than 100 m, 10 m, 1 m, or 1 mm.

The optical emitter 10 emits the light pulses toward the target scene. The target scene may include, for example, a taken object 200. The taken object 200 reflects or refracts an optical signal from the optical emitter 10 and directs part of the signal to the optical modulator 20. In this regard, the optical modulator 20 may be configured to modulate an optical state of at least part of light pulses returned from the target scene.

But setting of the optical modulator 20 is not limited thereto, in some embodiments, the optical modulator 20 may be provided between the optical emitter 10 and the target scene to modulate an optical state of the light pulses emitted from the optical emitter.

The optical modulator 20 may include a crystal having electro-optical modulation effect, and/or a crystal having acousto-optical modulation effect. The optical modulator 20 may be a variable Fabry-Perot standard device, and/or a Pockels effect device, a Kerr effect device, etc.

The crystal having electro-optical modulation effect (also referred to as "electro-optical crystal" herein) may be at least one of, for example, LiNbO3, BaTiO3, KD*P, ADP, KTN, PLZT, or BBO. A refractive index of the electro-optical crystal may undergo a change associated with an electric field strength applied to the electro-optical crystal, such that an optical signal passing through the electro-optical crystal obtains a phase delay and causes a corresponding change in a deflected state of the optical signal. According to an exemplary embodiment, a direction of the electric field applied to the electro-optical crystal may be perpendicular to a direction of propagation of the optical signal.

However, the present disclosure is not limited thereto, and any suitable electro-optical crystal material is possible within a scope of the teachings of the present disclosure, provided that when a certain voltage is applied to the electro-optical crystal, the refractive index of the electro-optical crystal undergoes the change associated with the electric field strength, causing a change in characteristics of an optical wave passing through the crystal, realizing modulation of a phase, amplitude, intensity and/or polarization state of the optical signal. The optical modulator 20 may modulate the intensity of the light pulses part into a function of time.

For an electro-optical modulator (EOM), an input polarization $P_{in}$ and an output polarization $P_{out}$ may satisfy the following relationship:

$$P_{out} = \begin{pmatrix} A(E(t)) & B(E(t)) \\ C(E(t)) & D(E(t)) \end{pmatrix} P_{in}$$

where A, B, C, and D are parameters of a Jones matrix of the electro-optical modulator, which are related to a phase delay of the EOM of each pixel, and E(t) is a modulation signal that varies monotonically with time to provide a one-to-one correlation between time and the phase delay.

In general, two measurements are required, i.e., without modulation or the modulation signal E(t) is constant, and modulation is applied so that the modulation signal E(t) is a function f(t) that varies with time.

When a fixed polarization component is added in front of the optical modulator 20, the system may be pre-calibrated and then measured once in practical application using the modulation signal E(t). The one-to-one corresponding relationship between time and the phase delay allows to obtain a time of flight of each pixel corresponding to a spatial point and its distance.

In some embodiments, the optical modulator 20 may include two electro-optical modulators. For example, as shown in FIG. 2, the optical modulator 20 may include a first electro-optical modulator 21 and a second electro-optical modulator 22. The first electro-optical modulator 21 and the second electro-optical modulator 22 may be connected in series. A direction of an optical axis of the electro-optic crystal included in the first electro-optic modulator 21 and a direction of an optical axis of the electro-optic crystal included in the second electro-optic modulator 22 may be perpendicular to each other. However, the present disclosure is not limited thereto, and the optical modulator 20 may also include, for example, three, four, or more electro-optical modulators. The plurality of electro-optical modulators may be connected in series, and have different or identical optical axis directions to each other.

By using the plurality of electro-optical modulators, a voltage required by the optical modulator 20 may be significantly reduced. In the case where the optical modulator 20 includes a plurality of electro-optical modulators, the electric field direction applied to each electro-optical modulator may be perpendicular to the direction of propagation of the optical signal, and the electric field directions applied to the electro-optical modulators may be different from each other. For example, the electric field direction applied to the first electro-optical modulator 21 may be perpendicular to the electric field direction applied to the second electro-optical modulator 22. It should be understood that the electric field direction applied to each electro-optical modulator may also be parallel to the direction of propagation of light, or in any other suitable direction capable of realizing the conception of the present disclosure.

At least within a first preset time range before the emission of the light pulses and/or within a second preset time range after the emission of the light pulses, the optical element array 30 has a function of transmitting light of at least three optical states different from each other, and the optical states include, but are limited to, a polarization state, transmission, and reflectivity.

The optical element array 30 may be formed by an array of polarizers, different areas of which may be used to transmit optical signals having different polarization states. The optical element array 30 may include one or more polarizer array units. The optical element array 30, the photoelectric detector 40, and the controller 50 may be configured to detect the polarization state of the optical signal, which will be described in detail below.

The optical element array 30 may include a thin film polarizer, a wire grid polarizer, a prismatic polarizer, a liquid crystal polarizer, or a combination thereof. Alternatively, the optical element array 30 may include at least three polarizers having fixed polarization directions, and the polarization directions of the at least three polarizers are different from each other.

In some embodiments, the optical element array 30 may include at least one optical element array unit, each of the at least one optical element array unit includes at least three polarization components having polarization directions different from each other. For example, each optical element array unit may include four linear polarizers. The four linear polarizers are arranged in a window shape, and the four linear polarizers have polarization directions different from each other.

As shown in FIG. 3A, each polarizer array unit may include a 0° polarizer $P_0$, a 45° polarizer $P_{45}$, a 90° polarizer $P_{90}$, and a 135° polarizer $P_{135}$. One or more polarizer array units form the optical element array 30. The 0° polarizer $P_0$ allows 0° polarized light to pass therethrough, the 45° polarizer $P_{45}$ allows 45° polarized light to pass therethrough, the 90° polarizer PH allows 90° polarized light to pass therethrough, and the 135° polarizer $P_{135}$ allows 135° polarized light to pass therethrough.

In some embodiments, the optical element array 30 may only include one polarizer array unit, i.e., the optical element array 30 may only include one 0° polarizer $P_0$, one 45° polarizer $P_{45}$, one 90° polarizer $P_{90}$, and one 135° polarizer $P_{135}$. The four polarizers are arranged in a window shape and each covers a quarter of the area of the rear photoelectric detector 40.

The polarizer array unit is not limited to the arrangement shown in FIG. 3A. In some other embodiments, each polarizer array unit may include, for example, three polarizers. The three polarizers and an area without polarizer are arranged in a window shape, and the three polarizers have polarization directions different from each other. For example, as shown in FIG. 3B, each polarizer array unit may include an area without polarizer NP, a 0° polarizer $P_0$, a 45° polarizer $P_{45}$, and a right-handed polarizer $P_R$. The area without polarizer NP may allow optical signals having any polarization state to pass therethrough, the 0° polarizer $P_0$ allows 0° polarized light to pass therethrough, the 45° polarizer $P_{45}$ allows 45° polarized light to pass therethrough and the right-handed polarizer $P_R$ allows optical signals in a right-handed polarization state to pass therethrough. In some embodiments, each polarizer array unit may also be set to include an area without polarizer NP, a 0° polarizer $P_0$, a 45° polarizer $P_{45}$, and a left-handed polarizer $P_L$ (not shown).

It should be understood that the arrangement of the polarizers on the optical element array 30 in the present disclosure is not limited to the combinations described herein, other combinations of polarizers capable of realizing detection of the polarization state of the optical signal are also feasible.

Alternatively, the optical element array 30 may also be formed by at least one polarization element having an adjustable polarization direction. Each polarizer array unit may include a polarization element having an adjustable polarization direction, e.g., a dynamic polarizer DP whose polarization direction may change over time. The polarization direction of the polarization element having an adjustable polarization direction may be controlled to change (e.g., by rotating the polarization element at high speed or by voltage modulation), e.g., so that the polarization direction of the polarization element is switched between 0°, 45°, 90°, and 135°. The polarization direction of the polarization element having an adjustable polarization direction may be switched sequentially in order of, for example, 0°, 45°, 90° and 135°, but the present disclosure is not limited thereto, the polarization direction of the polarization element having an adjustable polarization direction may also be switched sequentially in order of other angles.

As shown in FIG. 3C, the polarization direction of the dynamic polarizer DP may change over time and may have, for example, a polarization direction of 0° at time point $t_1$ and duration $\Delta t_1$, a polarization direction of 45° at time point $t_2$ and duration $\Delta t_2$, a polarization direction of 90° at time point $t_2$ and duration $\Delta t_2$, and a polarization direction of 135° at time point $t_4$ and duration $\Delta t_4$. $\Delta t_1$, $\Delta t_2$, $\Delta t_3$ and $\Delta t_4$ may be identical or different from each other. The switching of the dynamic polarizer DP between different polarization directions may be continuous or spaced.

In an exemplary embodiment, the polarization direction of the polarization element having an adjustable polarization direction may be switched at an extremely fast rate to realize transmission of parts of the optical signal having different polarization directions at different time points.

At least one photoelectric detector unit may be provided behind each polarizer, i.e., at least one pixel point corresponding to the polarizer is provided behind each polarizer. The photoelectric detector unit provided behind the polarizer may be configured to capture an optical signal transmitted from the polarizer. In some exemplary embodiments, the optical element array 30 including the array of polarizers may be integrated with the photoelectric detector 40.

The photoelectric detector 40 may include one or more photoelectric detector units. For example, the photoelectric detector 40 may include one or more CMOS sensors or sensor arrays. The photoelectric detector 40 may convert the received optical signal to an electrical signal. The photoelectric detector 40 may be coupled to the controller 50 to receive a control signal from the controller 50 and send a detected, for example, light intensity signal to the controller 50. As an application example, the photoelectric detector 40 may include a silicon-based detector CCD, CMOS, and/or Ge, InGaAs, InSb, InAs, HgCaTe, QWIP detector, or detector array.

The controller 50 may be configured to control the optical emitter 10, the optical modulator 20, and the photoelectric detector 40. The controller 50 may be in unidirectional/bidirectional communication with the optical emitter 10, the optical modulator 20, and the photoelectric detector 40 to implement a method for ranging using a three-dimensional imaging system. For example, the controller 50 may be in bidirectional communication with the optical emitter 10 and the photoelectric detector 40, and may be in unidirectional communication with the optical modulator 20.

Figure 8:
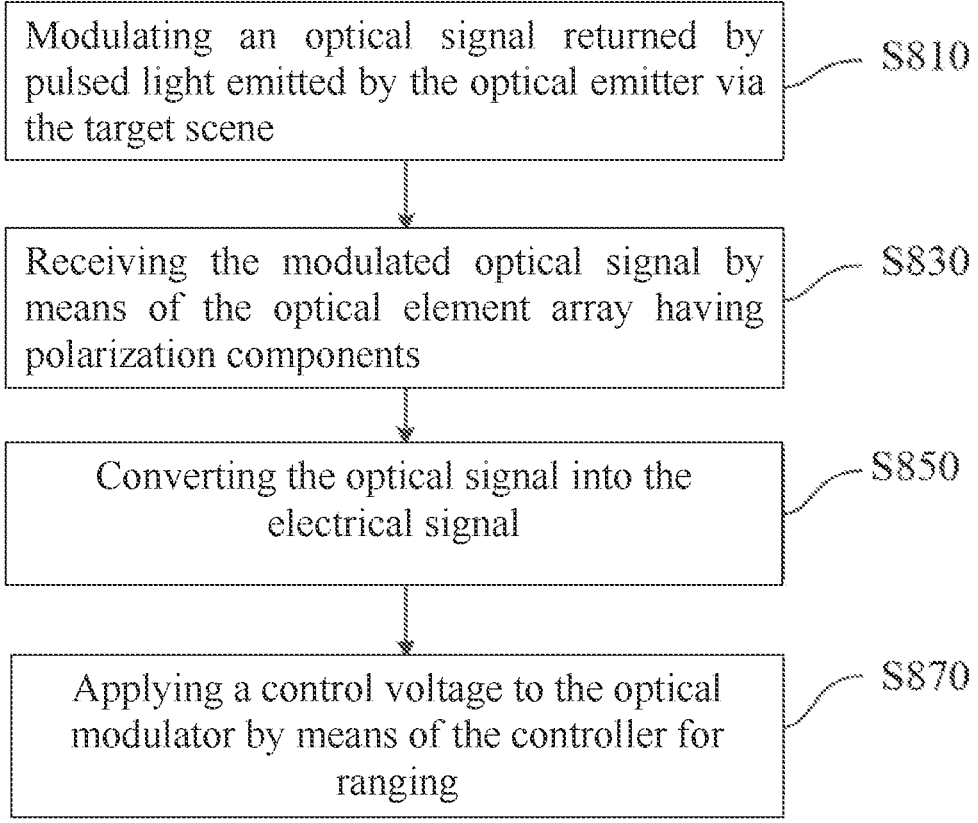
FIG. 8 shows a block diagram of a method for ranging using the three-dimensional imaging system according to an exemplary embodiment of the present disclosure.

FIG. 8 shows a method 800 for ranging using a three-dimensional imaging system according to an exemplary embodiment of the present disclosure. The method in FIG. 8 will be further described below with reference to interoperation between the components of the three-dimensional imaging system 100a of the above embodiment of the present disclosure.

In step S810, modulating, by means of the optical modulator 20, an optical signal returned by pulsed light emitted by the optical emitter 10 via the target scene.

In step S830, receiving the optical signal modulated via the optical modulator 20 by means of the optical element array 30. The optical element array 30 may include at least three polarization components having polarization directions different from each other. Alternatively, the optical element array 30 includes, at least within a predetermined period of time, at least one optical component that transmits light having at least three optical states different from each other.

In step S850, receiving, using the photoelectric detector 40, the optical signal passing through the optical element array 30 and converting the received optical signal into the electrical signal.

In step S870, applying a control by means of the controller 50 to the optical modulator 20, the optical modulator 20 modulating a return part of the light pulses into a function of time based on the control, and calculating the distance between each pixel point in the target scene and the optical emitter 10 and/or the relative light intensity of each pixel point in the target scene and other information by means of the controller 50 based on the electrical signal from the photoelectric detector 40 and the control applied to the optical modulator 20. Further, the optical emitter 10 may emit pulsed light having a preset wavelength and pulse width based on a pulsed light control signal received from the controller 50. The optical modulator 20 may modulate the phase, amplitude, intensity and/or polarization state of the optical signal based on a voltage scan signal received from the controller 50. The photoelectric detector 40 may capture image information based on the control signal received from the controller 50, while the controller 50 may receive the electrical signal from the photoelectric detector 40.

The controller 50 may calculate a distance of each pixel point in the target scene from the optical emitter, a relative light intensity of each pixel point in the target scene and/or other information based on the control applied to the optical modulator 20 and the electrical signal received from the photoelectric detector 40.

The control applied by the controller 50 to the optical modulator 20 is not limited to the scheme of applying a voltage for control, other feasible control schemes may also be adopted without departing from the teachings of the present disclosure, such as, but not limited to, current control, circuit-actuated mechanical component control, and light control.

In an exemplary embodiment, an imaging lens set may be provided between the optical modulator 20 and the optical element array 30. Alternatively, the imaging lens set may also be provided between the target scene and the optical modulator 20, or at other suitable position.

Figure 4:
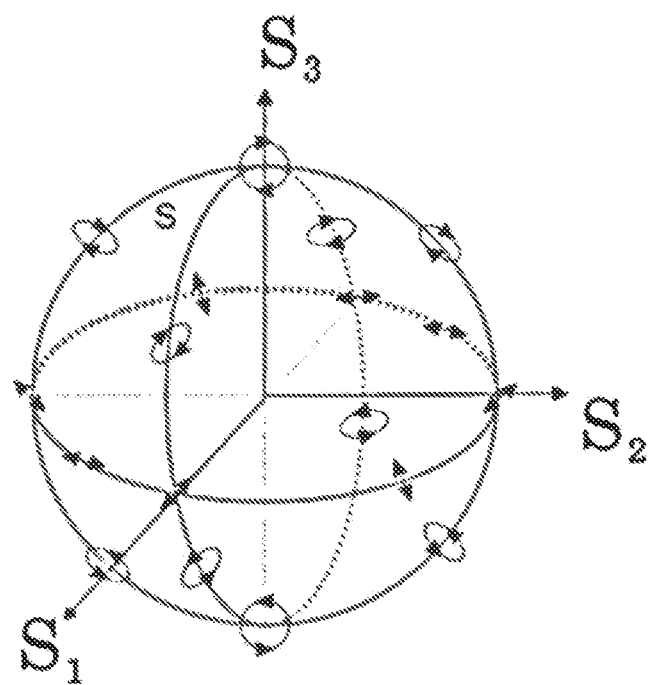
FIG. 4 shows a Poincare sphere model.

FIG. 4 shows a Poincare sphere model. The principle of determining a polarization state of an optical signal will be described below with reference to FIG. 4.

The polarization state of the optical signal may be detected by using Stokes parameters and combining the Poincaré sphere model. Assuming 100% polarization (i.e., full polarization state), the Stokes parameters $S_0$, $S_1$, $S_2$, and $S_3$ may be calculated using the method described below.

When using the array of polarizers as shown in FIG. 3A:

$S_0 = L_0 + L_{90}$ $S_1 = L_0 - L_{90}$ $S_2 = L_{45} - L_{135}$ $S_0^2 = S_1^2 + S_2^2 + S_3^2$ where, $L_0$ is light intensity through the 0° polarizer $P_0$, $L_{45}$ is light intensity through the 45° polarizer $P_{45}$, $L_{90}$ is light intensity through the 90° polarizer $P_{90}$ and $1,135$ is light intensity through the 135° polarizer $P_{135}$. Through the above equation relationships, corresponding values of the Stokes parameters $S_0$, $S_1$, $S_2$ and $S_3$ may be obtained.

When using the array of polarizers as shown in FIG. 3B:

$S_0 = L$ $S_1 = L_0 - 2L$ $S_2 = L_{45} - 2L$ $S_3 = L_R - 2L$ where, L is light intensity through the area without polarizer NP, $L_0$ is light intensity through the 0° polarizer $P_0$, $L_{45}$ is light intensity through the 45° polarizer $P_{45}$ and $L_R$ is light intensity through the right-handed polarizer $P_R$. Through the above equation relationships, corresponding values of the Stokes parameters $S_0$, $S_1$, $S_2$ and $S_3$ may be obtained.

After obtaining the corresponding values of the Stokes parameters $S_0$, $S_1$, $S_2$ and $S_3$, the polarization state of the optical signal may be determined in combination with the Poincare sphere model. As shown in FIG. 4, the poles of the sphere represent left-handed circular polarized light and right-handed circular polarized light; points on an equator represent line polarized light having different vibration directions; an upper hemisphere represents left-handed elliptical polarized light; and a lower hemisphere represents right-handed elliptical polarized light, etc. The specific polarization state of the optical signal may be obtained by taking points on the Poincare sphere model based on the corresponding values of $S_1$, $S_2$ and $S_3$.

The process of determining the polarization state of the optical signal in combination with the Poincare sphere model may be performed in the controller 50. Further, the controller 50 determines a corresponding relationship from the determined polarization state of the optical signal and a control voltage of the optical modulator 20 to determine the time of flight.

Figure 5:
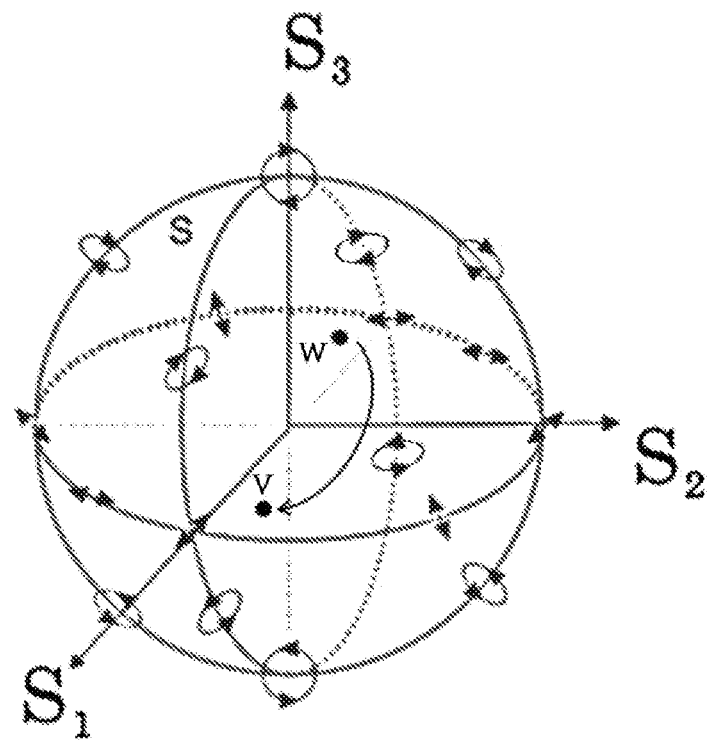
FIG. 5 shows a schematic diagram of determining a time of flight using a Poincare sphere model.

FIG. 5 shows a schematic diagram of determining a time of flight using a Poincare sphere model. The method for determining a time of flight will be described below with reference to FIG. 5.

For simplicity, the optical signal is assumed to be in full polarization state and normalized, i.e., $S_1^2 + S_2^2 + S_3^2 = 1$, and polarization state positions of the optical signal are all on the sphere of the Poincaré sphere. When a first shot is taken at an initial time point, an initial polarization state W of the optical signal may be obtained. As the voltage applied to the optical modulator 20 increases, the polarization state of the optical signal is changed, and its corresponding position on the Poincaré sphere changes accordingly. The optical signal that reaches the optical modulator 20 first in time has a small change in polarization state and, therefore, its polarization state is closer to the point W on the Poincaré sphere, while the optical signal that reaches the optical modulator 20 later in time has a large change in polarization state and, therefore, its polarization state is farther from the point W on the Poincaré sphere. When a second shot is taken at a next time point, the optical signal having an initial position (polarization state) of W moves along the sphere to a termination position V. Different points on a curve WV correspond to different times of flight. A distance corresponding to the point V may be determined by determining the positions of the points W and V and based on the control voltage of the optical modulator 20.

According to the above principle, a method for ranging using the three-dimensional imaging system 100a as described in FIG. 1 may include: taking a first shot of the target scene at an initial time point to obtain baseline image information; and taking a second shot at a next time point at a predetermined time interval from the initial time point to obtain comparative image information, where, the distance between each pixel point in the target scene and the optical emitter and/or the relative light intensity of each pixel point in the target scene is determined based on the baseline image information and the comparative image information.

It should be noted that the assumption that the optical signal is in full polarization state is for simplification of the model only, the method for determining a polarization state, a time of flight, and calculating a distance according to the present disclosure may be applied to optical signals having any polarization state. When the optical signal is not in the full polarization state, both a start point and a termination point may be located within the sphere.

Determining the polarization state of the optical signal using the method described above is less restrictive to an initial state of the optical signal, i.e., the initial state of the optical signal may be an optical signal having any polarization state, which may effectively reduce a loss of light energy. In addition, using the method for ranging as described above, measurements may be performed by directly using the CMOS sensor plus the array of polarizers, without the need for providing additional sensor arrays.

Figure 6:
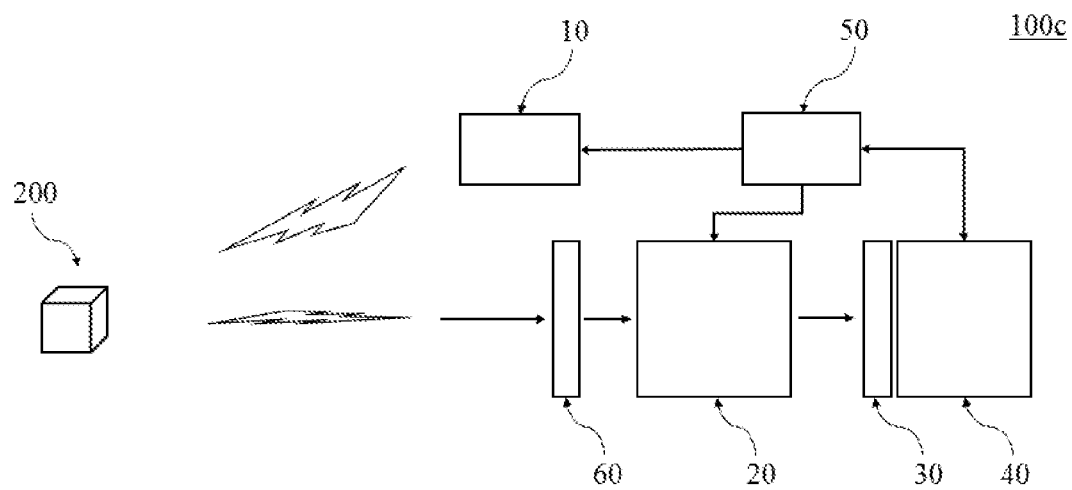
FIG. 6 shows a schematic diagram of a three-dimensional imaging system according to an exemplary embodiment of the present disclosure.

FIG. 6 shows a schematic diagram of a three-dimensional imaging system 100c according to an exemplary embodiment of the present disclosure.

The three-dimensional imaging system 100c shown in FIG. 6 differs from the three-dimensional imaging system 100a shown in FIG. 1 in that the three-dimensional imaging system 100c in FIG. 6 may also include a polarizer 60 provided in front of the optical modulator 20. That is, the polarizer 60 may be provided between the target scene (including, for example, the taken object 200) and the optical modulator 20. The polarizer 60 may be a linear polarizer and/or circular polarizer.

In an example, the polarizer 60 may be a linear polarizer having a certain orientation with a polarization direction not parallel to an optical axis of the optical modulator 20. By providing the linear polarizer 60 between the target scene and the optical modulator 20, polarizability of the optical signal propagating toward the optical modulator 20 may be determined. The linear polarizer 60 may be a 0° polarizer, a 45° polarizer, a 90° polarizer, a 135° polarizer, or a polarizer of any other angle.

Although providing the linear polarizer 60 in front of the optical modulator 20 results in a partial loss of light energy, by providing the linear polarizer 60, it is possible to make the polarization state of the optical signal in the initial state known, i.e., the initial polarization state W must be located at a point on the equator of the Poincaré sphere. In this way, a distance of each point in the scene and/or a relative light intensity of each point in the scene and other information may be determined from only one shot.

Thus, a method for ranging using the three-dimensional imaging system including the polarizer 60 may include: taking a shot at a predetermined time point to obtain image information, and determining the distance between each pixel point in the target scene and the optical emitter and/or the relative light intensity of each pixel point in the target scene based on the image information.

Figure 7:
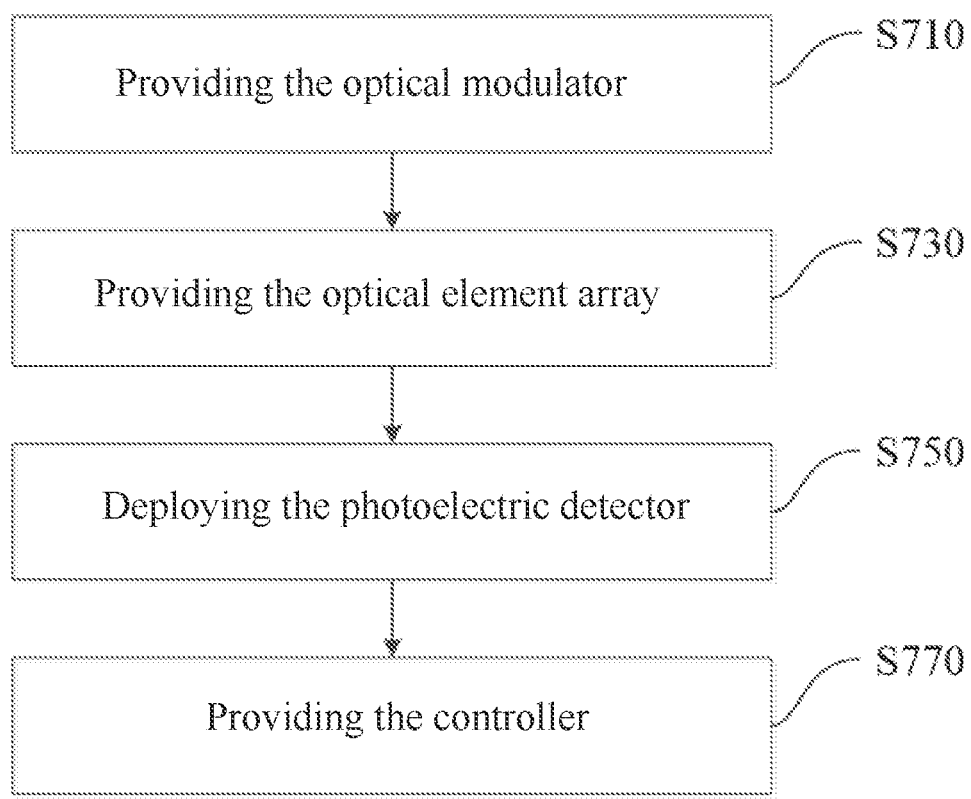
FIG. 7 shows a block diagram of a method for forming a three-dimensional imaging system according to an exemplary embodiment of the present disclosure.

FIG. 7 shows a block diagram of a method for forming a three-dimensional imaging system 100a.

Referring to FIG. 7, in step S710, providing the optical modulator 20 on an optical path of the optical emitter 10, such that pulsed light emitted by the optical emitter 10 is received and modulated by the optical modulator 10 when returning via the target scene. In step S730, providing the optical element array 30 in a path of emitted light of the optical modulator 20 to receive the modulated optical signal, where the optical element array 30 includes at least three polarizers, and the at least three polarizers have polarization directions different from each other. In step S750, deploying the photoelectric detector 40 behind the optical element array 30 to receive the optical signal passing through the optical element array 30 and to convert the received optical signal to the electrical signal. In step S770, providing the controller 50 to be electrically connected to the optical emitter 10, the optical modulator 20, and the photoelectric detector 40, where the controller 50 communicates with the optical emitter 10, the optical modulator 20, and the photoelectric detector 40.

The controller 50 may apply a control voltage to the optical modulator 20, and the optical modulator 20 modulates a return part of the light pulses into a function of time based on the control voltage. The controller 50 may calculate the distance between each pixel point in the target scene and the optical emitter 10 and/or the relative light intensity of each pixel point in the target scene and other information based on the electrical signal from the photoelectric detector 40 and the control voltage applied to the optical modulator 20.

In some embodiment, the controller 50 applies the control to the optical modulator 20 by means of the circuit, and the optical modulator 20 modulates an optical state of the return part of the light pulses into a monotonic function of time based on the control.

Although the present disclosure includes specific examples, it will be apparent upon understanding the disclosure of the present disclosure that various changes in form and detail may be made in these examples without departing from the spirit and scope of the claims and their equivalents. The examples described herein are considered only in a descriptive sense and not for the purpose of limitation. The description of a feature or aspect of the present disclosure in each example will be considered applicable to similar features or aspects of the present disclosure in other examples. Suitable results may also be achieved if the techniques described are performed in a different order, and/or if the components in the systems, architectures, devices, and/or circuits described are combined in different ways and/or are replaced or supplemented by other components or their equivalents. Accordingly, the scope of the present disclosure is not limited by the particular embodiments, but by the claims and their equivalents, and all variations within the scope of the claims and their equivalents shall be construed to be included in the present disclosure.

What is claimed is:

1. A three-dimensional imaging system, comprising:
   an optical emitter, configured to emit light pulses to a target scene, the target scene returning at least part of the light pulses;
   wherein, the three-dimensional imaging system further comprises:
   an optical modulator, configured to modulate a polarization state of at least part of the light pulses emitted from the optical emitter and/or of at least part of light pulses returned from the target scene;
   an optical element array, configured to receive at least part of the modulated light pulses, wherein at least within a first preset time range before the emission of the light pulses and/or within a second preset time range after the emission of the light pulses, the optical element array has a function of transmitting light of at least three polarization states different from each other;
   a photoelectric detector, comprising an imaging lens, configured to receive an optical signal passing through the optical element array, and convert the received optical signal to an electrical signal; and
   a controller, wherein the controller applies a control to the optical modulator by means of a circuit, the optical modulator modulates the polarization state of the light pulses emitted from the optical emitter and/or of at least part of the light pulses returned from the target scene into a function of time based on the control, and the controller calculates a distance between each pixel point in the target scene and the optical emitter and/or a relative light intensity of each pixel point in the target scene based on the electrical signal from the photoelectric detector and the control applied to the optical modulator,
   wherein the optical element array comprises at least one optical element array unit, and the photoelectric detector comprises at least one photoelectric detector unit corresponding to the at least one optical element array unit, wherein
   each of the at least one optical element array unit comprises at least three polarization components having polarization directions, the polarization directions of the at least three polarization components are different from each other, and the at least three polarization components are arranged in a window shape and each of the at least three polarization components covers a quarter of an area of a corresponding photoelectric detector unit; or
   each of the at least one optical element array unit comprises a dynamic polarizer whose polarization direction changes over time.

2. The three-dimensional imaging system according to claim 1, wherein the optical element array unit comprises four polarizers, and the four polarization components are respectively a 0° directional linear polarizer, a 45° directional linear polarizer, a 90° directional linear polarizer and a 135° directional linear polarizer.

3. The three-dimensional imaging system according to claim 1, wherein three polarization components of the at least three polarization components having polarization directions different from each other are respectively a 0° directional linear polarizer, a 45° directional linear polarizer, and a left-handed polarizer or right-handed polarizer.

4. The three-dimensional imaging system according to claim 1, wherein the optical element array comprises a thin film polarizer, a wire grid polarizer, a prismatic polarizer, a liquid crystal polarizer, or a combination thereof.

5. The three-dimensional imaging system according to claim 1, wherein the optical modulator comprises a crystal, a liquid crystal having electro-optical modulation effect, and/or a crystal, a liquid crystal having acousto-optical modulation effect.

6. The three-dimensional imaging system according to claim 1, wherein the optical modulator comprises a plurality of optical modulators connected in series.

7. The three-dimensional imaging system according to claim 1, wherein the optical element array and the photoelectric detector are integrally integrated.

8. The three-dimensional imaging system according to claim 1, wherein the optical emitter and the photoelectric detector are integrally integrated, or formed separately and then integrated.

9. The three-dimensional imaging system according to claim 1, wherein the light pulses have a wavelength of 300 nm-750 nm, 700 nm-1000 nm, 900 nm-1600 nm, 1 um-5 um or 3 um-15 um.

10. The three-dimensional imaging system according to claim 1, wherein the light pulses have a pulse width of 0.1 ps-5 ns, 1 ns-100 ns, 100 ns-10 us, or 10 us-10 ms.

11. The three-dimensional imaging system according to claim 1, wherein the photoelectric detector comprises a silicon-based detector CCD, CMOS, and/or Ge, InGaAs, InSb, InAs, HgCaTe, QWIP detector or detector array.

12. The three-dimensional imaging system according to claim 1, further comprising a lens provided close to one side of the target scene, and/or a lens provided between the optical modulator and the optical element array.

13. The three-dimensional imaging system according to claim 1, further comprising a linear polarizer and/or circular polarizer provided on a side of the optical modulator close to the target scene.

14. A method for ranging using a three-dimensional imaging system, comprising:
   providing an optical modulator on an optical path of an optical emitter, such that pulsed light emitted by the optical emitter has a time-varying optical state when returning via a target scene;
   receiving an optical signal modulated via the optical modulator by means of an optical element array;
   deploying a photoelectric detector behind the optical element array to receive the optical signal passing through the optical element array and to convert the received optical signal to an electrical signal; and
   providing a controller to be electrically connected to the optical emitter, the optical modulator, and the photoelectric detector, wherein the controller applies a control to the optical modulator, the optical modulator modulates a return part of light pulses into a function of time based on the control, and the controller calculates a distance between each pixel point in the target scene and the optical emitter and/or the relative light intensity of each pixel point in the target scene based on the electrical signal from the photoelectric detector and the control applied to the optical modulator;

wherein the three-dimensional imaging system comprises:

the optical emitter, configured to emit the light pulses to the target scene, the target scene returning at least part of the light pulses;

wherein, the three-dimensional imaging system further comprises:

the optical modulator, configured to modulate a polarization state of at least part of the light pulses emitted from the optical emitter and/or of at least part of light pulses returned from the target scene;

the optical element array, configured to receive at least part of the modulated light pulses, wherein at least within a first preset time range before the emission of the light pulses and/or within a second preset time range after the emission of the light pulses, the optical element array has a function of transmitting light of at least three polarization states different from each other;

the photoelectric detector, comprising an imaging lens, configured to receive an optical signal passing through the optical element array, and convert the received optical signal to the electrical signal; and the controller, wherein the controller applies a control to the optical modulator by means of a circuit, the optical modulator modulates the polarization state of the light pulses emitted from the optical emitter and/or of at least part of the light pulses returned from the target scene into a function of time based on the control, and the controller calculates the distance between each pixel point in the target scene and the optical emitter and/or a relative light intensity of each pixel point in the target scene based on the electrical signal from the photoelectric detector and the control applied to the optical modulator, wherein the optical element array comprises at least one optical element array unit, and the photoelectric detector comprises at least one photoelectric detector unit corresponding to the at least one optical element array unit, wherein each of the at least one optical element array unit comprises at least three polarization components having polarization directions, the polarization directions of the at least three polarization components are different from each other, and the at least three polarization components are arranged in a window shape and each of the at least three polarization components covers a quarter of an area of a corresponding photoelectric detector unit; or each of the at least one optical element array unit comprises a dynamic polarizer whose polarization direction changes over time.

15. The method according to claim 14, wherein the controller applies the control to the optical modulator by means of the circuit, and the optical modulator modulates an optical state of the return part of the light pulses into a monotonic function of time based on the control.

16. A method for ranging using a three-dimensional imaging system, comprising:

taking a first shot of a target scene at an initial time point to obtain baseline image information; and taking a second shot at a next time point at a predetermined time interval from the initial time point to obtain comparative image information, wherein, a distance between each pixel point in the target scene and an optical emitter and/or the relative light intensity of each pixel point in the target scene is determined based on the baseline image information and the comparative image information;

wherein the three-dimensional imaging system comprises:

the optical emitter, configured to emit light pulses to the target scene, the target scene returning at least part of the light pulses;

wherein, the three-dimensional imaging system further comprises:

an optical modulator, configured to modulate an optical state of at least part of the light pulses emitted from the optical emitter and/or of at least part of light pulses returned from the target scene;

an optical element array, configured to receive at least part of the modulated light pulses, wherein at least within a first preset time range before the emission of the light pulses and/or within a second preset time range after the emission of the light pulses, the optical element array has a function of transmitting light of at least three optical states different from each other;

a photoelectric detector, comprising an imaging lens, configured to receive an optical signal passing through the optical element array, and convert the received optical signal to an electrical signal; and a controller, wherein the controller applies a control to the optical modulator by means of a circuit, the optical modulator modulates the optical state of the light pulses emitted from the optical emitter and/or of at least part of the light pulses returned from the target scene into a function of time based on the control, and the controller calculates the distance between each pixel point in the target scene and the optical emitter and/or a relative light intensity of each pixel point in the target scene based on the electrical signal from the photoelectric detector and the control applied to the optical modulator, wherein the optical element array comprises at least one optical element array unit, and the photoelectric detector comprises at least one photoelectric detector unit corresponding to the at least one optical element array unit, wherein each of the at least one optical element array unit comprises at least three polarization components having polarization directions, the polarization directions of the at least three polarization components are different from each other, and the at least three polarization components are arranged in a window shape and each of the at least three polarization components covers a quarter of an area of a corresponding photoelectric detector unit; or each of the at least one optical element array unit comprises a dynamic polarizer whose polarization direction changes over time.

* * * * *